May 22, 1923. 1,456,403
W. C. RANNEY
PROCESS OF REPAIRING OR CLOSING PUNCTURES IN PNEUMATIC TIRES AND PLUG FOR THAT PURPOSE
Filed March 25, 1920

Inventor
William C. Ranney.
By John S. Barker
Attorney

Patented May 22, 1923.

1,456,403

UNITED STATES PATENT OFFICE.

WILLIAM C. RANNEY, OF ELBRIDGE, NEW YORK.

PROCESS OF REPAIRING OR CLOSING PUNCTURES IN PNEUMATIC TIRES AND PLUG FOR THAT PURPOSE.

Application filed March 25, 1920. Serial No. 368,588.

*To all whom it may concern:*

Be it known that I, WILLIAM C. RANNEY, a citizen of the United States, residing at Elbridge, in the county of Onondaga and State of New York, have invented certain new and useful Improvements in Processes of Repairing or Closing Punctures in Pneumatic Tires and Plugs for that Purpose, of which the following is a specification.

My invention relates to the art of repairing pneumatic tires and has for its object to provide a new plug or closure for this purpose and also to devise a method by which this work can be accomplished in a novel, effective and expeditious manner.

In the accompanying drawings—

Figure 1:
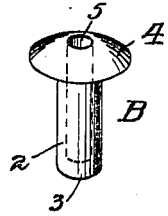
Figure 1 is a perspective view of one of the plugs used in practicing my invention.

In the drawings A represents a section of a pneumatic tire or similar fabric in which is an aperture $a$ that is to be plugged and closed. B designates the plug such as I use for closing the aperture. It is preferably formed of soft rubber or like flexible, resilient material, and consists of a stem 2 closed at one end, 3, and having surrounding its other, open, end, a flange 4. The longitudinal opening 5 through the stem of the plug extends nearly to its end 3, and the stem is preferably of such length that when inserted into the opening $a$ that it is to close, it extends a considerable distance beyond the inner face of the fabric A.

In order to insert the plug B, and to fill the opening 5 therein, as I shall presently describe, I have devised the implement C, which preferably consists of a handle 6 from one end of which extends a slender pin 7, the end of which is preferably blunt and enlarged as indicated at 8. From the other end of the handle extends another pin 9, the end of which is forked as at 10.

Figure 3:
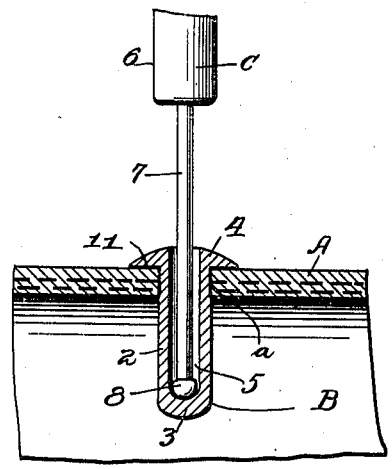
Fig. 3 is a sectional view of one of the plugs, just inserted into an opening through a pneumatic tire for a bicycle.
Figure 4:
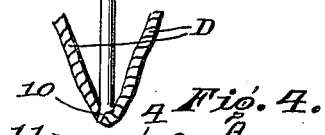
Fig. 4 is a sectional view similar to Fig. 3 illustrating the next step in the process of repairing a tire.
Figure 4:
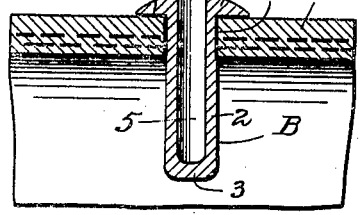
Figure 5:
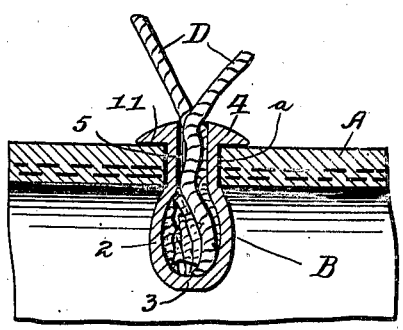
Fig. 5 is a similar view illustrating the final step in the process.
Figure 2:
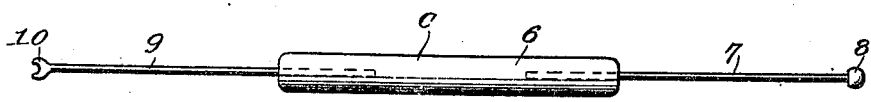
Fig. 2 is an elevation of a tool adapted to be used in practicing the invention.

Supposing the fabric A be a bicycle tire that has been punctured, and that a repair is desired, I first shape and enlarge the puncture, making a smooth aperture $a$ of a size to receive the stem of the plug B. The inner wall of the opening $a$ and the fabric about it are cleaned and preferably coated with rubber or other suitable cement, as indicated at 11. I then take one of the plugs B and after coating with cement the under surface of the flange 4 and the neck of the stem 5 adjacent to such flange, insert the stem through the opening $a$ using for this purpose the implement C, as represented in Fig. 3. Upon withdrawing the pin 7, leaving the plug in place, the latter soon becomes firmly seated and will often form a satisfactory and serviceable closure for the opening $a$ without further treatment. However, it is desirable to expand the stem 2 upon the inside of the fabric, as represented in Fig. 5, and this may be accomplished in the following manner. A cord D which is preferably saturated with rubber or other cement is inserted, by means of the forked pin 9, into the opening 5 of the stem, as represented in Fig. 4, and is packed therein as represented in Fig. 5, until the inner closed portion of the stem has been expanded, forming an enlargement on the inner side of the tire of such size that it cannot pass through the opening $a$. The cord is packed into the hollow stem 3 until the portion of the stem on the inside of the tire, which is expansible, becomes not only distended but the enlargement thus formed becomes hard. The cement with which the cord D is saturated causes the several loops thereof that are forced into the stem, to adhere one to another and to the inner side walls of the stem, consolidating the packing and forming a coherent mass that is not likely to come out of the plug. The projecting ends of the cord D may be then sheared off and the opening through the flange of the plug sealed with cement, thus forming a closure that not only effectually seals the opening, but one that retains its place against all conditions of wear and use to which it may be subjected.

I have found that a plug such as described may be more easily inserted than those of the kind heretofore in use in which the stem is solid, or if hollow has the opening at its end remote from the head or flange and which when used has its head forced through the opening in the tire with the intent that it shall press against and adhere to the inner surface of the tire. This practice necessitates the use of special tools, requires that the hole through the tire fabric shall be larger than that required in the use of plugs fashioned according to my invention, and the plugs cannot be so securely seated and held in position as are those which I have devised when seated according to the process herein described.

While I have referred to the tool C in describing the invention, it is not necessary that such tool be used. A small stick like a match stem may be used for inserting the plug, and for packing it with the cord D. Again, other material than cord could be used for packing the stem of the plug, cotton fiber, small pieces of cloth, and the like, being suitable for this purpose. However, I prefer to practice the invention as first described.

The invention has been found particularly useful in the repair of pneumatic tires for bicycles, but it is not to be limited in its useful applications to tires of this kind, as the plugs B may be formed of different sizes and proportions, adapting them to be used with heavier tires than those used upon bicycles, or for use in connection with the inner tubes of tires for motor vehicles.

What I claim is:—

1. The herein described process of closing an opening through a pneumatic tire, which consists in inserting through the opening a hollow, flexible and expansible plug, the inner end of which is closed, then inserting into the opening of the said plug, from the outside, a material that will cause the inner portion of the plug to expand, and causing the material so inserted to consolidate to prevent its easy removal from the interior of the plug.

2. The herein described process of closing an opening through a fabric such as a pneumatic tire which consists in inserting through the opening a plug having a hollow stem closed at its inner end and open at its other end, which consists in inserting the stem of the plug through the opening from the outside, then inserting a flexible material into the stem of the plug and packing it therein on the inside of the fabric, thereby causing the inner portion of the stem to expand.

3. The herein described process of closing an opening through a fabric such as a pneumatic tire, which consists in inserting through the opening a plug having a hollow stem closed at its inner end and open at its other end, which consists in inserting the stem of the plug through the opening from the outside, then inserting a flexible fibrous material and cement into the stem of the plug and packing it therein on the inside of the fabric, thereby causing the inner portion of the stem to expand, and leaving the said packing within the stem to become set through the action of the cement.

WILLIAM C. RANNEY.